(12) United States Patent
Labonte et al.

(10) Patent No.: US 10,146,449 B1
(45) Date of Patent: Dec. 4, 2018

(54) PURCHASE PLANNING FOR DATA STORAGE PROCESSING SYSTEMS

(71) Applicant: EMC Corporation, Hopkinton, MA (US)

(72) Inventors: Kevin S. Labonte, Upton, MA (US); Natalie Lee Chin Wong, Newton, MA (US); Qi Jin, Sudbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 182 days.

(21) Appl. No.: 14/751,702

(22) Filed: Jun. 26, 2015

(51) Int. Cl.
*G06F 3/06* (2006.01)

(52) U.S. Cl.
CPC .......... *G06F 3/0616* (2013.01); *G06F 3/0653* (2013.01); *G06F 3/0683* (2013.01)

(58) Field of Classification Search
CPC ..... G06F 3/0616; G06F 3/0683; G06F 3/0653
See application file for complete search history.

(56) References Cited

U.S. PATENT DOCUMENTS

| | | | |
|---|---|---|---|
| 5,828,583 A * | 10/1998 | Bush | G06F 11/004 702/185 |
| 8,010,738 B1 * | 8/2011 | Chilton | G11C 16/349 711/103 |
| 9,037,921 B1 * | 5/2015 | Brooker | G06F 12/02 369/53.1 |
| 9,143,926 B2 | 9/2015 | Egner et al. | |
| 2010/0313072 A1 * | 12/2010 | Suffern | G06F 11/0706 714/37 |
| 2011/0099320 A1 * | 4/2011 | Lucas | G06F 3/0616 711/103 |
| 2015/0234716 A1 * | 8/2015 | Brooker | G06F 11/1458 714/47.1 |
| 2016/0292025 A1 * | 10/2016 | Gupta | G06F 11/076 |

* cited by examiner

*Primary Examiner* — Michael Alsip
(74) *Attorney, Agent, or Firm* — BainwoodHuang

(57) ABSTRACT

A technique of automatically predicting data storage configuration events, such as purchase decisions, based upon individual data storage drive properties, client storage usage and behavior trends is described. The behavior trends may include customer actions, such as deleting snap shots or otherwise deleting data, typical ordering times and delays, and expected installation and acceptance testing times. The technique collects operational data and calculates statistical trends. The technique automatically notifies a data storage system manager of the calculated data when the operational data indicates that the data storage system will need reconfiguration and recommends data storage drive properties to acquire.

21 Claims, 4 Drawing Sheets

PURCHASE PLANNING FOR DATA STORAGE PROCESSING SYSTEMS

BACKGROUND

Data storage systems are arrangements of hardware and software that include one or more storage processors coupled to arrays of non-volatile storage devices, such as magnetic disk drives, electronic flash drives, and/or optical drives. The storage processors service storage requests, arriving from host machines ("hosts") which specify files or other data elements to be written, read, created or deleted, for example.

Occasionally, a non-volatile storage device will either be filled with data or, in some cases, break down so that a new storage device will need to be purchased. In conventional approaches to purchasing storage devices, people who manage such data storage systems manually decide to purchase a data storage drive based upon their experience with such drives and other considerations, e.g., budget or usage.

SUMMARY

Unfortunately, there are deficiencies with the above-described conventional approaches. For example, manual purchase decisions tend to be made too late and in response to emergency situations. One reason for this is that the people who manage data storage systems are typically unaware of the nuances of the storage media they use which may influence some of the need to purchase additional data storage drives.

In contrast to the conventional approaches to purchasing storage devices which tend to be done in a reactionary manner, improved techniques for automatically predicting client storage configuration events such as purchase decisions, involve continuous monitoring of the usage rates of individual data storage drives as well as the overall usage rate of the data storage system. For example, a computer monitors data to create a model of data storage usage over time. From this model the computer analyzes trends in the monitored data to predict a probable date when the additional data storage drive capacity needs to be added or replaced. The model takes as input client-supplied specifications as well as data storage drive properties, the trends in the monitored data, and frequencies of other customer actions, such as deleting snap shots or otherwise deleting data, data storage drive ordering times and delays, and installation times.

An embodiment of the improved techniques is directed to a method of automatically predicting configuration events in data storage systems includes receiving, by a computing device at specified intervals, operational data values from a data storage system. The operational data values represent current data storage system usage and behavior over time, where the data storage system includes a set of data storage drives. The method includes storing the operational data values in a memory location, and calculating a notice date indicating a point in time when a statistical trend in the stored operational data values exceeds a selected operational value limit for the data storage system. The method includes transmitting the notice date to a selected location including recommendations for additional data storage drives. The recommendations may include a type and size of data storage drives to acquire, as well as including a typical delivery time period, an installation time period, and an ordering time period needed to obtain and install the additional data storage drives prior to the calculated date. The recommendations may also include identification of data storage drives that are nearing the end of useful life and need to be replaced. The improved techniques provide automatic predictions of probable data storage drive purchases in time to order, obtain, and install the data storage drives prior to the data storage system problems.

Another embodiment of the improved techniques is directed to a computer program product for automatically predicting configuration events in data storage systems includes a set of instructions causing a controller to perform a technique including receiving monitoring data from each individual one of a set of storage drives of the data storage system at preselected time intervals and recording the monitoring data in a memory. The technique includes calculating a set of data trends for the monitoring data for each individual one of the set of storage drives, including a statistical trend for each of a maximum amount of data stored in the storage drive as a function of time, a maximum response time for data operations, and a time to reach a preselected number of data rewrites. The technique includes calculating a projected lifetime value for each individual one of the set of storage drives using the set of data trends, and determining, based upon the projected lifetime values, a warning date having a selected probability of the data storage system exceeding a selected limit value. The technique then includes transmitting the warning date to a first location.

A further embodiment of the improved techniques is directed to an electronic apparatus for automatically predicting configuration events in data storage systems includes a network interface, a buffer memory, a memory and processing circuitry coupled to the network interface, the memory and the buffer memory. The memory stores instructions which, when carried out by the processing circuitry, cause the processing circuitry to receive operational data values from each one of a set of data storage drives of a data storage system at selected intervals, the operational data values representing current data storage usage and behavior over time. The processing circuitry will store the operational data values from each one of the set of data storage drives in a memory location, calculate a statistical trend for the operational data values, determine a warning date when a calculated trend in the operational data values exceeds a selected operational value limit for the data storage system, and transmit a notice to a selected location a selected time prior to the determined warning date.

The improved techniques for automatically predicting configuration events in data storage systems may be combined in various ways and implemented with other variations that do not depart from the essential principles of the improvement.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
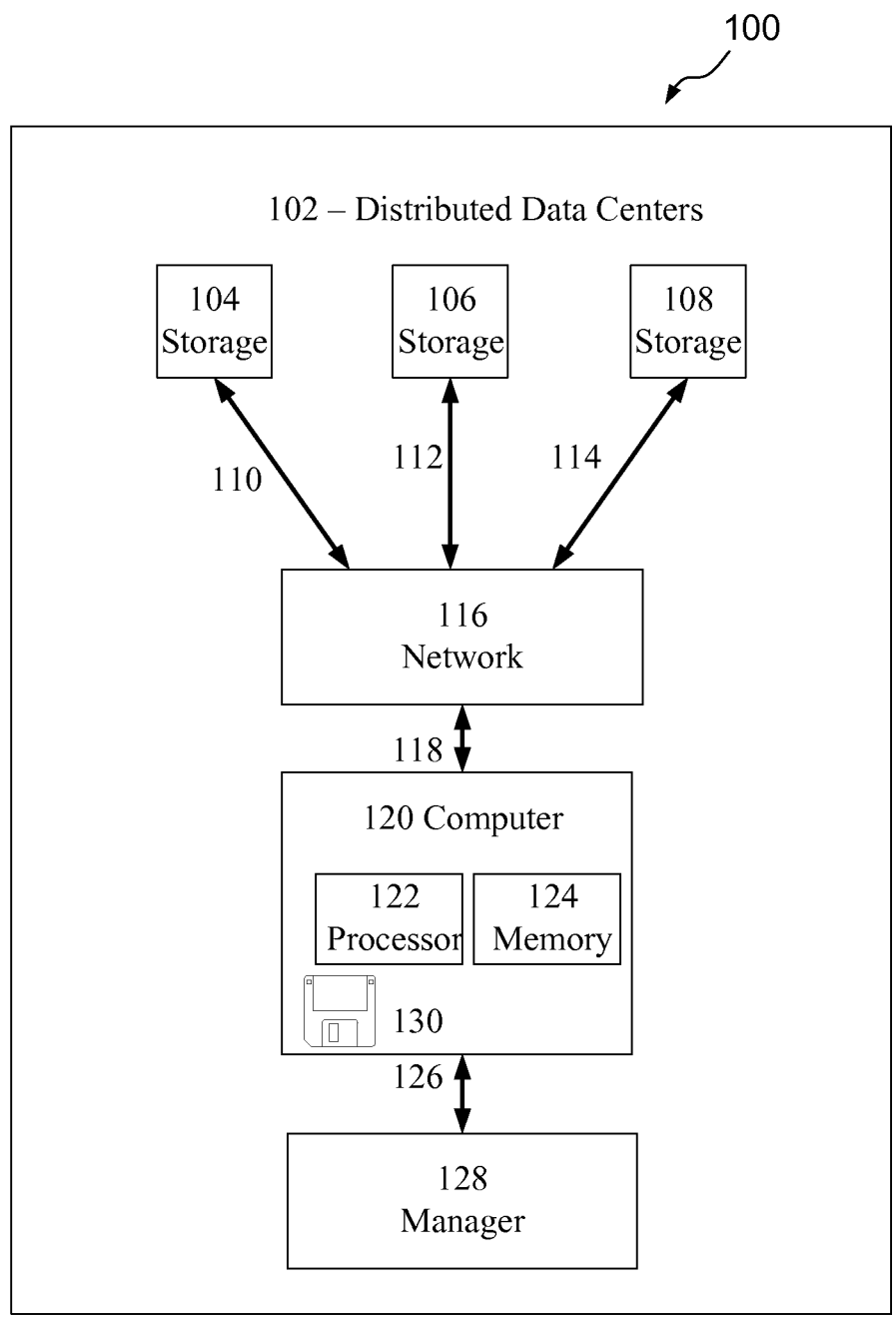
FIG. 1 is a block diagram of a distributed storage environment using the improved techniques.

People managing large data storage systems cannot easily determine accurately when additional data storage capacity is likely to be needed due to the very large number of interacting and competing activities of an operational data storage system servicing hundreds of clients. In addition, the amount of data stored in a data storage system may oscillate up and down on an hour to hour basis depending upon many different factors including time of day, regularly scheduled data backup operations, compression of less used files, and removal of snap-shots. Thus a person looking at the current data utilization cannot determine when a data storage system is nearing capacity limits. An automatic system for predicting when a data storage system needs to be reconfigured is needed.

A reason why individual computer owners or large system managers cannot accurately predict when to order new data storage drives is because large data storage systems may have dozens of individual data storage processors, and may include hundreds of groups of data storage drives. In addition, the drives may be organized in redundant arrays of individual drives (i.e., RAIDs), or in tiers of data storage drives where each tier may contain similar types of data storage drives. Each of the data storage drives may contain spinning magnetic media, such as magnetic disks, or semiconductor devices, such as FLASH memory chips organized into solid state disks (i.e., SSDs), or other types of volatile or non-volatile memory devices such as optical disks. Each type of memory device has different sets of drive characteristics, such as data storage capacity, energy consumption, thermal output, write access speed, read access speed, failure mechanisms, heat sensitivities, failure rates and lifetimes. Thus, the large number of data storage drives, the different types of drives and the variations in storage usage result in a hard to analyze system for a person.

Data storage systems have a maximum amount of data that can be stored in the system and typically the amount of data stored goes up as time passes until the data storage system is full and can no longer store new data. It should be noted that although the amount of data in a data storage systems generally increases for short periods of time the amount of data stored may decline if a user decides to delete old files, remove what may be known as 'snapshots' after a certain time period has elapsed, remove unused files, or compress older files, etc. When a data storage system reaches its maximum storage capacity the computing systems that utilized the data storage systems may not be able to operate. To avoid this sort of problem data centers may examine the utilization levels of the individual data storage drives that are part of the data storage system to ensure that sufficient storage capacity will be available. In large data storage systems having hundreds of data storage drives this may be an impossible task for a person since there are so many data storage drives to examine and trends in the amount of data stored in each individual one of the many data storage drives may vary depending upon how long the data storage drive has been in operation and in the type of data storage drive being considered. The number of possible combinations of interactions between different tiers of data storage drives is huge and it may be impossible for a person to calculate or track.

Further, certain types of data storage drive have failure rates that depend upon the number of times a data cell is rewritten, which is not visible to anyone outside of the data storage system since data may be moved around within the data storage system for various reasons. For example, data that is currently being actively used in an operation (i.e., hot data) may be stored in a cache for rapid access, while data that has not been accessed in the past minute (i.e., warm data) may be transferred from the cache to a solid state disk (i.e., a SSD) having a much larger storage capacity than a cache, but with a slower access rate. If that data is again called by the operation it may be transferred by the SSD back to the cache for the rapid access. If the data in the SSD is not used for a specified period of time (i.e., cool data) it may be moved to a magnetic disk, which has much greater data capacity and much lower cost compared to the SSD, but much slower access times. For example, the storage system supports tiers which will automatically move data across different drive types based upon data storage usage. This type of operation is not controlled by the system administrator. Data may also be internally transferred between different data storage drives for back up or for load balancing purposes. Thus, a person such as a system manager cannot track the number of times a data cell is rewritten.

As a result of the complexity and interactions, data storage managers cannot predict when a certain data storage drive will be likely to fail (for example an SSD memory) and need to be replaced, nor can they accurately predict when the overall data storage system will require additional data storage drives to meet increasing demand for data storage. A technique for automatically predicting data storage configuration events in a data storage system (e.g., adding data storage drives) based upon individual drive properties, user data storage usage and user behavior trends may improve predictions.

Automatically predicting data storage configuration events, such as new data storage drive purchase decisions, may be based upon a combination of individual drive properties, typical client storage usage and behavior trends such as deleting snap shots or otherwise deleting data. The automatic techniques may include monitoring actual data storage drive utilization operational values over time, and using statistical analysis to predict future trends and a date when the trends result in exceeding client determined operational limit values. The predicted date may be indicated to the management at a time prior to the predicted date of exceeding the operational limit values by expected time values of ordering times and delays, and installation times.

FIG. 1 is a block diagram of a distributed storage environment 100 using the improved techniques. The distributed data storage centers 104, 106 and 108 may be portions of a single corporate structure physically located in different locations, or may be separate data storage entities. The data storage centers 104, 106 and 108 are connected by communication means 110, 112 and 114 respectively, a network 116, and another communication means 118 to processor 122 in computer 120. Computer 120 may also include a memory 124 and a communication port for sending and receiving communications. The communication means may be hard wired, wireless, RF or any means of data communication. The network 116 may be a local area network (LAN), a wide area network (WAN), the internet, the cloud, or any networking means. The computer 120 may be any form of electronic device capable of sending and receiving data communications and performing data manipulations and calculations, such as a personal computer, processor, work station, laptop and other electronic devices.

An electronic apparatus for implementing the improved techniques may include a network interface, a buffer memory, and a data storage memory 124 coupled to processing circuitry included in a processor 122. The network interface, a buffer memory, the data storage memory 124 may be included in the electronic processor 122, or may be separate devices. The network interface connects the computer 120, via various communication means, to a network 116 and a manager 128. The network 116 connects the computer 120 to a set of data storage devices 104, 106 and 108 for transmission of data. The computer 120 may include a computer program product 130 having a non-transitory computer readable medium which stores a set of instructions for preforming operations in accordance with the improved techniques as discussed below.

In operation, the processor 122 may receive data from the data centers 104, 106 and 108 at selected intervals. For example, data storage centers 104, 106 and 108 may be continuously sending operational data values to processor 122, or may send operational data values at regular time intervals such as every five minutes, or may send operational data values based upon a selected number of data operations, such as write requests or read requests, or in any other desired method. The operational data may include current values of data storage system usage, such as the number of LUNs of data in a data storage drive having a known maximum number of LUNs of data storage capacity. Operational data may include current queue wait times for read and write requests in the data center or in selected ones of a set of data storage drives included in the data storage center, or it may include the number of times the data storage cells have been rewritten.

The processor 122 stores the received data in memory 124 and calculates a statistical model for the time dependent trend of the operational data values. For example, for the data system usage values collected and stored over time the processor 122 may perform a statistical curve fit approximation to project a time when the data storage drive may exceed its maximum capability. The time period over which the statistical curve fit approximation may, for example, be hourly measurements taken over the past 12 months. The processor 122 may calculate statistical models for other operational data values, such as request response times, or response error rates for selected ones of the data storage drives included in the data storage centers. In addition, the processor 122 may calculate statistical models for the overall operational data of the data storage centers, and may calculate a notice date when anyone of the data storage drives included in the data storage centers is predicted to exceed an operational limit.

After calculating the notice date, the processor 122 may send a notice via communication means 126 to a selected location, such as a data system manager 128. The notice may include the date at which the data storage system (i.e., one of the storage systems 104, 106 and 108) is predicted to require additional data storage drive capacity, the amount of additional data storage capacity needed, and a recommend type and size of data storage drive. The notice date may be transmitted to the manager 128 as soon as the processor 122 determines the notice date, or the notice date may be transmitted at a client selected time prior to the notice date, or the notice date may be transmitted at a time prior to the notice date by a time period equal to or greater than a client supplied typical purchase decision time period, plus client supplied values for delivery time, installation time, acceptance testing time, and other expected time periods affecting the desired lead time for ordering data storage drives.

The notice date transmission may also include a recommendation for the type of additional data storage drive needed. For example, the operational data values for data operation request response times maybe slower than the client specified limit value. In such a situation the processor 122 might recommend the purchase of a SSD type data storage drive to increase the amount of relatively fast response data storage capacity, even though purchase of a magnetic disk data storage drive would be less expensive.

Figure 2:
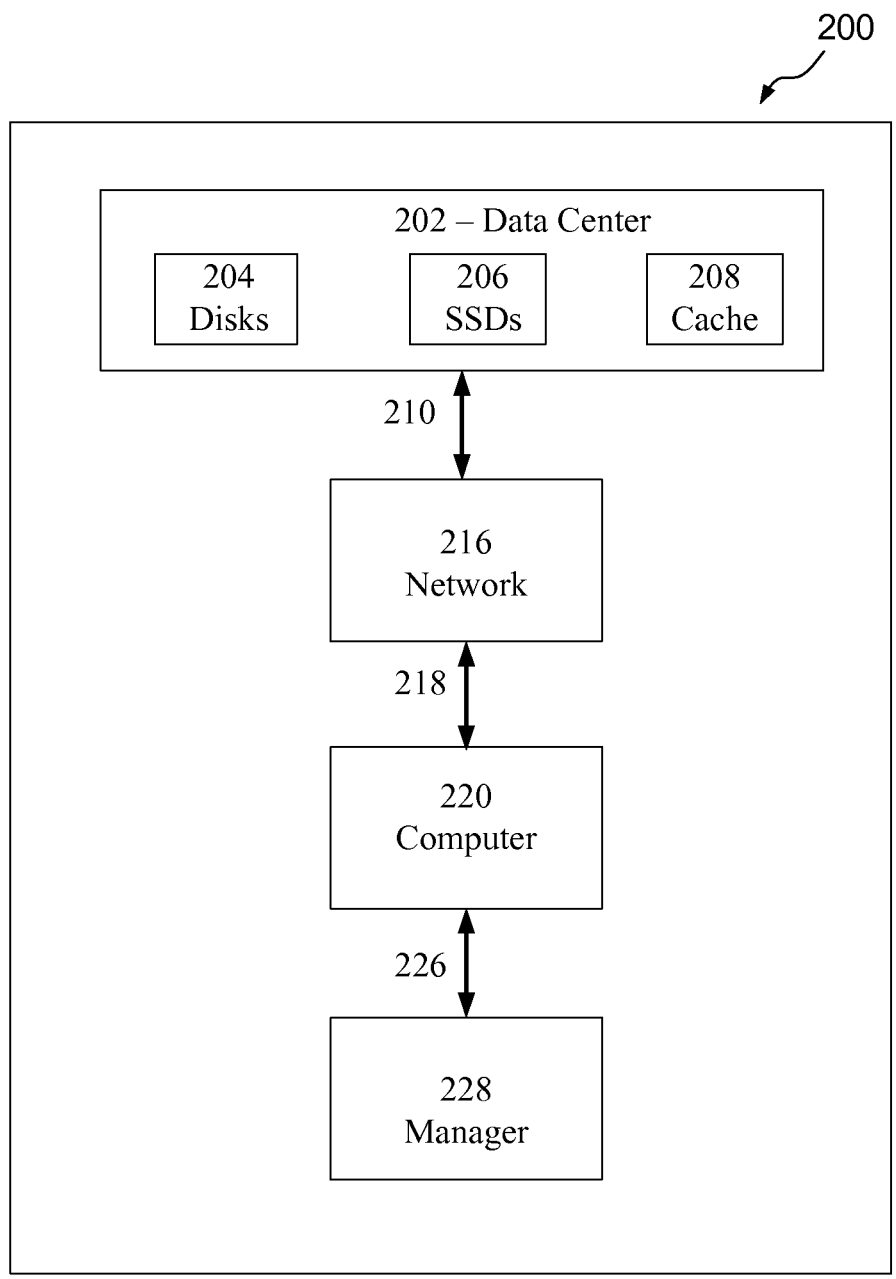
FIG. 2 is a block diagram of a data center environment having tiered data storage drives using the improved techniques.

FIG. 2 is a block diagram of a data center environment 200 having tiered data storage drives using the improved techniques in a single data center 202 having the data storage drives set up in tiers of similar drive types. For example, the magnetic disk tier 204 may include various types of magnetic disk drives, each drive having a known memory storage capacity, access speed and age. There may be magnetic disks arranged in redundant arrays such as a RAID, large capacity individual magnetic disk drives, or other magnetic memory types included in this tier.

The SSD tier 206 may include various types of semiconductor memory types such as non-volatile random access memory (NVRAM), FLASH memory, or other known persistent memory devices that may be organized as solid state disks. Each SSD element may have different levels of data storage density and access times, and each element may have different failure modes and different average time between failures. For example, FLASH devices have a known failure mode that relates to the number of times that memory cells in the FLASH device have been rewritten. After a generally known number of rewrites, which may be different for different FLASH types, the failure rate increases rapidly and the device may need to be replaced to reduce the rate of overall data storage system failure. SSD drives are generally more expensive and have faster access speeds as compared to magnetic disk drives, which is a purchase consideration.

The cache tier 208 may include random access memory (RAM) of various types. Cache data storage devices have the fastest memory access times, but are more expensive than SSD or magnetic disks, and may include volatile memory types such as DRAM as compared to the non-volatile memory types typically found in SSD devices.

The computer 220 will record the operational data values from the various tiers 204, 206 and 208 of the data center 202 via the communication means 210, the network 216 and the communication means 218, and calculate the time dependent trend of the operational data values as discussed above. A tiered structure for arranging the data storage drives may allow the processor to more easily determine operational data value trends for different data storage drive types, for example, the failure rate of certain types of SSD device related to a maximum allowable number of data rewrites.

For example, the computer 220 may record the rewrite rate of data storage drive devices in the SSD tier 206, and calculate a statistical trend to predict when each element may reach a preselected number of data rewrites. The preselected number of rewrites may depend upon the specific type of semiconductor memory and a level of risk acceptable to the specific client. After a notice date is determined for replacing a data storage drive in the SSD tier 206, the transmission may also include recommendations for replacing certain data storage drives because of predicted drive failures. For example, a specific FLASH memory device may be reaching the known number of data rewrite cycles discussed above, and thus approaching a statistical lifetime risk limit for failure. This needs to be done automatically because the ability of the system manager 228 to determine when a FLASH type memory may be approaching an end of life point is very limited due to data rewrites consisting of internal data transfers between various members of the set of data storage drives (for example from the SSD 206 to the Disks 204) which are not visible to observers outside the data storage system in the data center 202, as compared to the client data requests. Such internal data transfers may be due to system load balancing programs, or memory access speed programs where frequently used data is kept in fast memory types such as semiconductor cache, while less used data is kept in denser but slower access data storage memory types, such as SSD or magnetic disk.

Figure 3:
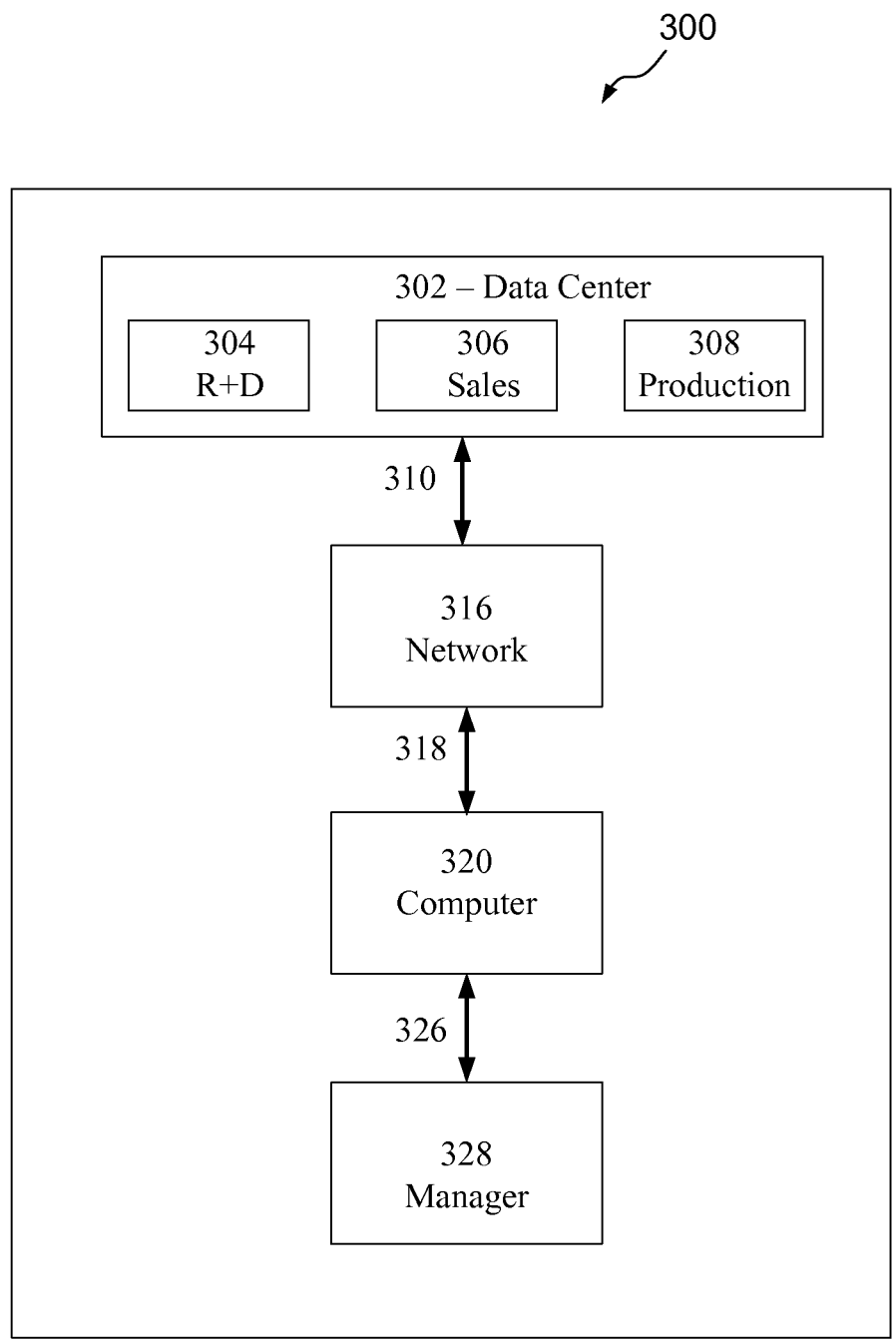
FIG. 3 is a block diagram of a data center environment having a different partition of the data storage drives using the improved techniques.

FIG. 3 is a block diagram of a data center environment 300 having a different partition of the data storage drives using the improved techniques. A data center 302 may partition the data storage drives into groups depending upon the uses to which the data storage drives are intended. For example, the data storage drives 304 may be used by the research and development group (R+D) and may not require as high a level of request access times as the data storage drives 306 used by the sales group, and may further not require as high a level of availability as the data storage drives 308 used by the production organization.

The computer 320 may collect the operational data values as discussed previously, but may calculate the trend limits differently for each organization. This may be significant since it may be more important to have more fast access memory for request access time requirements of intermediate results in the heavy calculations needed by the R+D group, while very large capacity data storage may be more important for the heavy memory use of the sales group, or consistent and reliable data access may be critical for the production group. The computer 320 may thus calculate notice dates for increasing or replacing data storage drives differently for each of the different data storage system groups, and may recommend different types of additional data storage drive types for the different user requirements.

Figure 4:
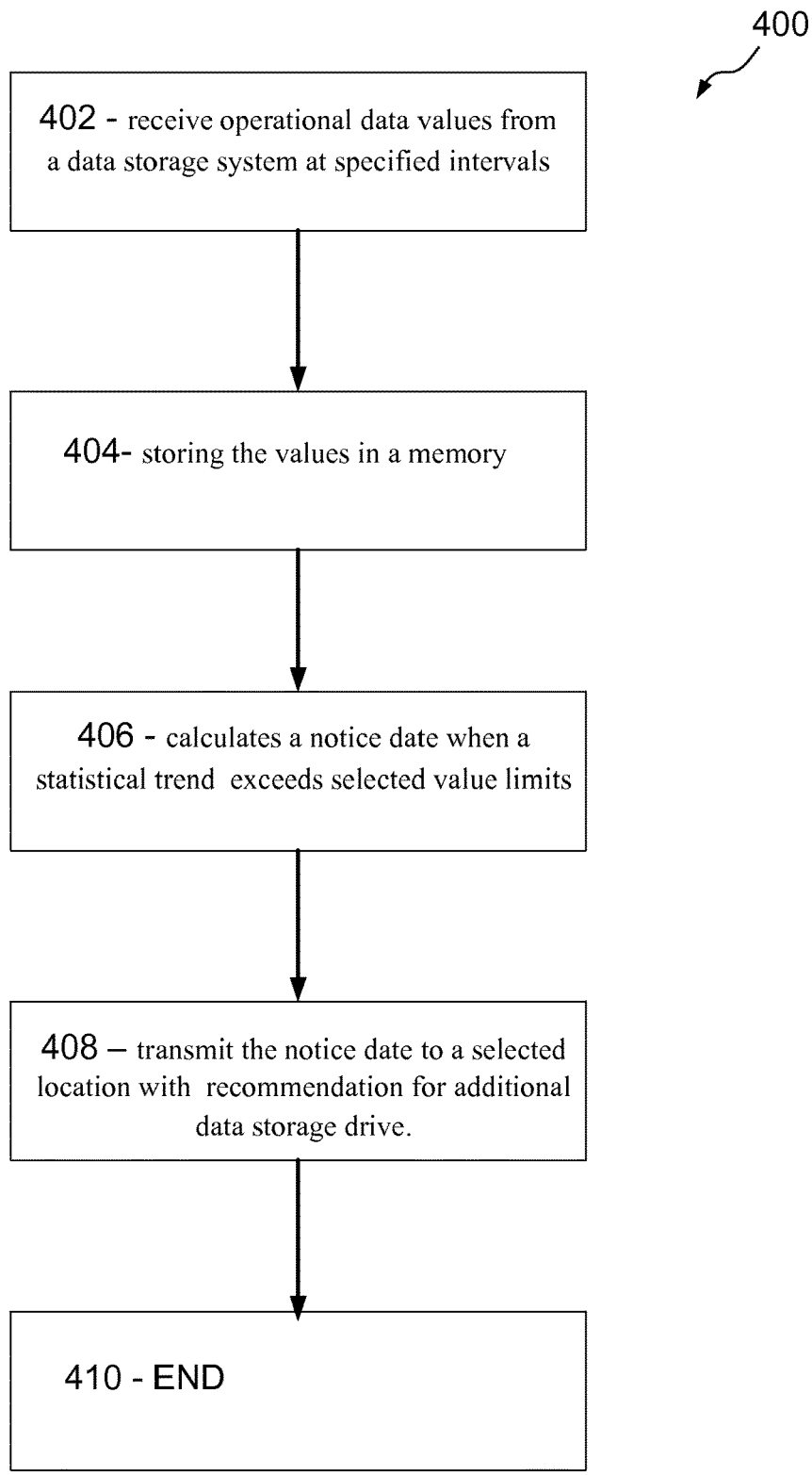
FIG. 4 is a flow chart illustrating the improved techniques.

FIG. 4 is a flow chart illustrating a method of automatically predicting configuration events in data storage systems according to the improved techniques 400. At 402, a computer receives operational data values from a data storage system at specified intervals. The operational data values represent current data storage system usage and behavior over time. The data storage system includes a set of data storage drives, and stores the values in memory at 404.

At 406, the computer calculates a notice date indicating a point in time when a statistical trend in the stored operational data values exceeds selected operational value limits for the data storage system. At 408, the computer transmits the notice date to a selected location including a recommendation for an additional data storage drive. The selected location may be a data system manager. The technique ends at 410.

In general the improved technique involves an electronic device continuously monitoring each data storage drive's usage and compiling historical data on drive usage to predict when additional drive capacity will be needed based upon historical trends and estimated ordering lead times. The improved technique can also predict FLASH data storage drive lifetimes based upon monitoring the number of rewrites experienced by each data storage drive and the number of internal data moves between drive tiers, neither of which are externally visible to operators. The improved technique monitors data storage drive pool usage to predict when pools need to be upgraded and monitors the overall data storage system to suggest increases in certain components of the multi-tiered memory pool and shifting the balance of the different types of storage in the pools.

The recommended purchases may be based upon how long the user desires to have the upgrade last and a desired performance level. For example, a data storage system may be continuously monitored to determine system usage trends and performance. When the utilization level reached a user predetermined level such, as a predicted 80% of maximum capacity for some period of time, then the improved technique can determine when the user should order an upgrade to prevent data handling issues, and to provide a cost benefit analysis related to the type of drive to obtain. With certain types of drive, for example Flash drives, the usage level can predict when the drive error rate may be expected to exceed a user preselected level. This prediction may be based upon factors that are not visible to the operators of the system, such as the number of rewrites to portions of the drive memory or the amount of data transferred between the Flash drive and other memory tiers.

The improved techniques reduce the cost of ordering drive upgrades before they become necessary, or the cost of lost operational efficiency for ordering drive updates too late to have the upgrade occur prior to operational failures.

While various embodiments of the invention have been particularly shown and described, it will be understood by those skilled in the art that various changes in form and details may be made therein without departing from the spirit and scope of the invention as defined by the appended claims.

What is claimed is:

1. A method of automatically predicting configuration events in data storage systems, comprising:
   receiving, by a computing device at specified intervals, operational data values from a data storage system, the operational data values representing current data storage system usage and behavior over time, the data storage system including a set of data storage drives;
   storing, by the computing device, the operational data values in a memory location;
   generating, from the operational data values, a statistical model of the current data storage system usage and behavior over time;
   obtaining, from the statistical model, a statistical trend in the stored operational data values;
   selecting a probability of the data storage system exceeding selected operational value limits for the data storage system;
   calculating, by the computing device, a notice date indicating a point in time when the statistical trend in the stored operational data values exceeds the selected operational value limits for the data storage system, wherein calculating the notice date includes (i) calculating a projected lifetime value for each data storage drive using the statistical trend, and (ii) determining, by the computing device based at least upon the calculated projected lifetime value for each data storage drive, a warning date having the selected probability of the data storage system exceeding the selected operational value limits for the data storage system; and
   transmitting, by the computing device at a selected time prior to the warning date, the notice date to a selected location including a recommendation for an additional data storage drive.

2. The method of claim 1, wherein transmitting further includes identifying selected ones of the set of data storage drives to be replaced.

3. The method of claim 1, wherein transmitting further includes identifying additional data storage drive capacity to prevent exceeding the selected operation value limits for the data storage system.

4. The method of claim 1, wherein the set of data storage drives are separated into set of tiers of data storage drives, each individual tier of data storage drives comprising a type of data storage drive having an individual set of drive characteristic value ranges.

5. The method of claim 4, wherein calculating the notice date further includes calculating a statistical trend for each individual one of the set of tiers of data storage drives.

6. The method of claim 1, wherein receiving the operational data values further includes:
   receiving monitoring data from each individual one of the set of data storage drives at preselected time intervals;
   storing the operational data values for each individual one of the set of data storage drives in the memory location; and
   calculating a statistical trend for each individual one of the set of data storage drives.

7. The method of claim 1, wherein calculating the notice date further includes calculating a trend in a maximum amount of data stored in each individual one of the set of data storage drives.

8. The method of claim 1, wherein calculating the notice date further includes calculating a trend in a maximum response time for data operations in each individual one of the set of data storage drives.

9. The method of claim 1, wherein calculating the notice date further includes calculating a time to reach a preselected number of rewrites of data in each individual one of the set of data storage drives.

10. The method of claim 1, wherein transmitting the notice date to the selected location further includes transmitting the notice date at the selected time prior to the warning date, the selected time being determined by subtracting stored values of a delivery time period, an installation time period, and an ordering time period from the warning date.

11. The method of claim 1, wherein calculating the notice date further includes calculating a suggested type of data storage drive to add to the storage system.

12. A computer program product having a non-transitory computer readable medium which stores a set of instructions for monitoring a data storage system in an electronic device, the set of instructions causing a controller to perform a method, the method comprising:
   receiving operational data values from the data storage system at preselected time intervals, the operational data values representing current data storage system usage and behavior over time, the data storage system including a set of data storage drives;
   recording the operational data values in a memory;
   generating a statistical model of the current data storage system usage and behavior over time from the operational data values;
   obtaining, from the statistical model, a statistical trend in the recorded operational data values;
   selecting a probability of the data storage system exceeding a selected limit value for the data storage system;
   calculating a notice date indicating a point in time when the statistical trend in the recorded operational data values exceeds the selected limit value for the data storage system,
   wherein calculating the notice date includes (i) calculating a projected lifetime value for each data storage drive using the statistical trend, and (ii) determining, based upon the calculated projected lifetime value for each data storage drive, a warning date having the selected probability of the data storage system exceeding the selected limit value for the data storage system; and
   transmitting, at a selected time prior to the warning date, the notice date to a first location.

13. The computer program product of claim 12, wherein transmitting the notice date further includes transmitting at a time prior to the warning date by an amount of time determined by subtracting stored values of delivery and installation time periods from the warning date to obtain a transmission date limit.

14. The computer program product of claim 12, wherein calculating further includes calculating a trend in a maximum response time for data operations in each individual one of the set of data storage drives.

15. The computer program product of claim 12, further including:
   receiving storage drive characteristics for each individual one of the set of storage drives of the data storage system, including a mean number of data rewrites to failure;
   determining, based upon a time to reach a preselected number of data rewrites and the mean number of data rewrites to failure, a drive replacement date for each individual one of the set of storage drives of the data storage system; and
   transmitting a replacement warning to the first location indicating the storage drive and the drive replacement date at a selected time interval before the drive replacement date.

16. An electronic apparatus, comprising:
a network interface;
a memory; and
processing circuitry coupled to the network interface, the memory and the buffer memory, the memory storing instructions which, when carried out by the processing circuitry, cause the processing circuitry to:
   receive operational data values from a data storage system at selected intervals, the operational data values representing current data storage usage and behavior over time, the data storage system including a set of data storage drives;
   store the operational data values in a memory location;
   generate, from the operational data values, a statistical model of the current data storage usage and behavior over time;
   obtain, from the statistical model, a statistical trend in the stored operational data values;
   select a probability of the data storage system exceeding a selected operational value limit for the data storage system;
   calculate a notice date indicating a point in time when the statistical trend in the stored operational data values exceeds the selected operational value limit for the data storage system,
   wherein calculate the notice date includes (i) calculate a projected lifetime value for each data storage drive using the statistical trend, and (ii) determine, based at least upon the calculated projected lifetime value for each data storage drive, a warning date having the selected probability of the data storage system exceeding the selected operational value limit for the data storage system; and
   transmit the notice date to a selected location at a selected time prior to the determined warning date.

17. The apparatus of claim 16, wherein the statistical trend is obtained for each individual one of the set of data storage drives of the data storage system, a warning date is determined for each individual one of the set of data storage drives of the data storage system when the obtained statistical trend exceeds a selected operational value limit for the individual one of the set of data storage drives; and the notice date is transmitted to the selected location including an identification of the individual one of the set of data storage drives.

18. The apparatus of claim 16, wherein the operational data values include at least one of an amount of data stored in the data storage drives as a function of time, a response time for data operations in the data storage drives, and a number of data rewrites in the data storage drives.

19. The apparatus of claim 18, wherein the operational data values include a type of the individual one of the set of data storage drives, and the statistical trend is obtained to determine a date when the individual one of the set of data storage drives will exceed a selected number of data rewrites.

20. The method of claim 1 wherein the transmitting of the notice date includes identifying additional data storage drive capacity to prevent exceeding the selected operation value limits for the data storage system, and wherein the method further comprises:

predicting, from the statistical trend, a probable date when the additional data storage drive capacity needs to be added or replaced.

21. The method of claim 1 further comprising:

performing, for the stored operational data values, a statistical curve fit approximation to project a time when a maximum capability of the data storage system is exceeded.

\* \* \* \* \*